March 27, 1951     J. H. WITTMANN     2,546,285
MIXING RECEPTACLE
Filed May 26, 1947
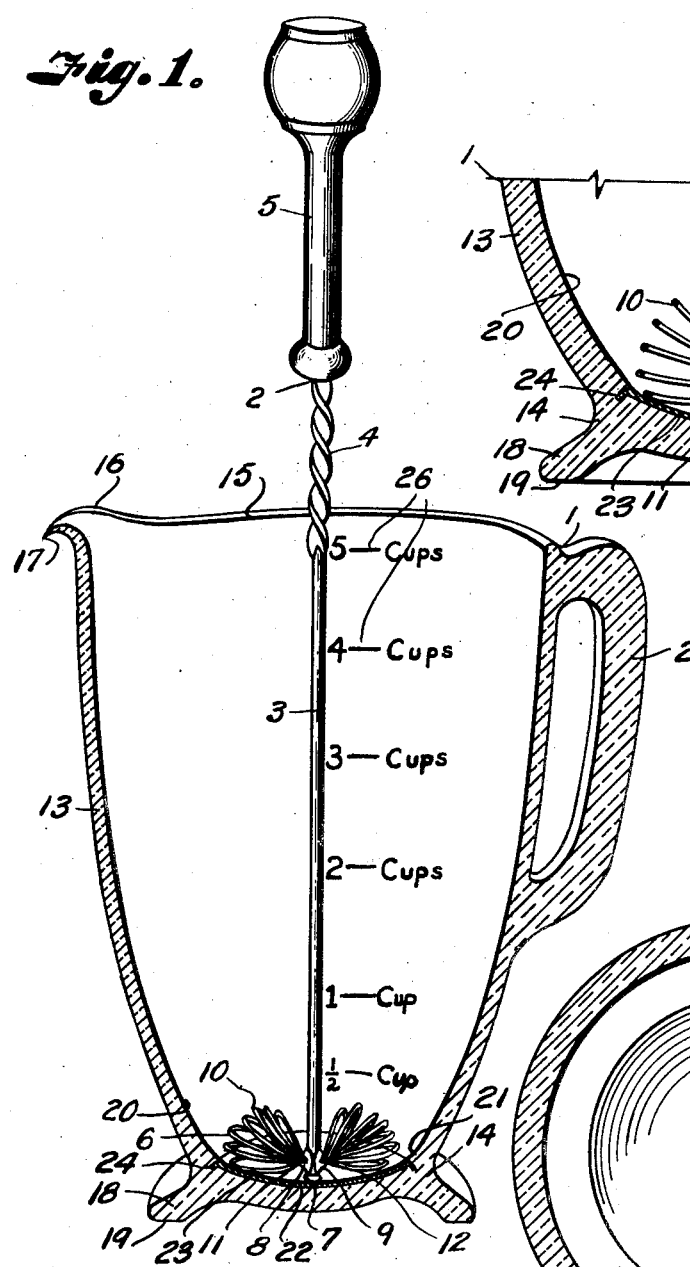
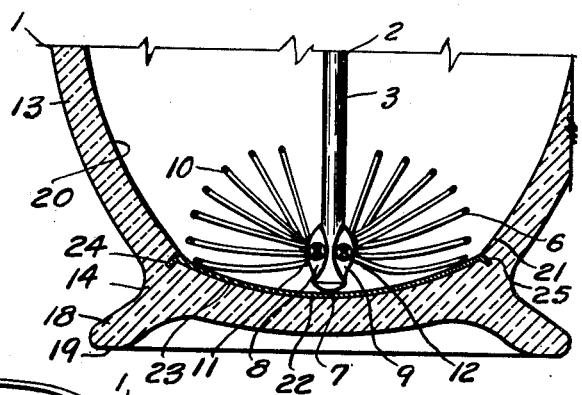
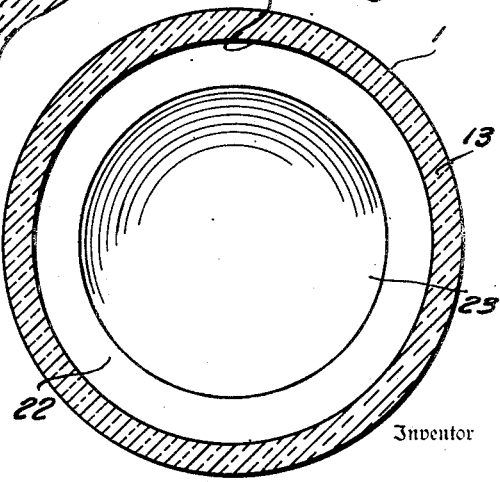
Inventor
By Joseph H. Wittmann
Fishburn + Mullendore
Attorney Patented Mar. 27, 1951

2,546,285

UNITED STATES PATENT OFFICE 2,546,285

MIXING RECEPTACLE

Joseph H. Wittmann, Los Angeles, Calif.

Application May 26, 1947, Serial No. 750,433

5 Claims. (Cl. 259—101)

This invention relates to mixing receptacles particularly for use in connection with mixing devices of the type disclosed in Patent No. 2,278,398 issued to me on March 31, 1942. When such mixing device is used in a receptacle formed of plastic, glass, china, pottery, and similar materials, the bearing tip of the drive shaft spins in the same spot and soon scratches and chips the bottom of the receptacle.

It is, therefore, the principal object of the present invention to provide a receptacle having a bottom of the desired shape and which is constructed to prevent scratching and chipping thereof by the mixing device.

A further object of the invention is to provide the bottom of the receptacle with an inlaid plate having a concavo-convex shape and which is firmly bedded into the material of which the receptacle is formed.

A further object of the invention is to provide the receptacle with a pouring spout shaped to permit slow pouring without dribbling of the liquid down the side of the receptacle.

In accomplishing these and other objects of the invention hereinafter pointed out, I have provided improved structure, the preferred form of which is illustrated in the accompanying drawing wherein:

Fig. 1 is a vertical section through a mixing receptacle embodying the features of the present invention and showing a bottom mixing agitator inserted therein.

Fig. 2 is an enlarged vertical section through the bottom of the receptacle to better illustrate the wear resisting plate.

Fig. 3 is a horizontal section through the mixing receptacle but showing the mixing device removed therefrom.

Fig. 4 is an enlarged fragmentary section through the pouring spout.

Fig. 5 is a front view of the spout.

Referring more in detail to the drawing:

1 designates a mixing receptacle constructed in accordance with the present invention and which is particularly adapted for use in connection with a mixing device 2 of the type illustrated in the above mentioned patent. Briefly, the mixing device includes a shaft 3 having a spirally-shaped end 4 carrying a handle 5 that is connected therewith to produce an oscillatory rotation of the mixing elements 6 when reciprocatory pressure is applied to the handle 5. The lower end of the shaft has a ball or cone-shaped end 7 adapted to bear on the bottom of the mixing receptacle under downward pressure applied to the handle. Extending laterally from the sides of the shaft at a point slightly above the bearing tip 7 are laterally extending ears 8 and 9 to which are connected the mixing elements 6. The mixing elements 6 are of the bottom-scraping and mixing type as disclosed in my patent and illustrated in the present case as being composed of wire-like material of resilient character and wound into helical form to provide a plurality of convolutions 10 which may increase in diameter from one end toward the center of the helical form and then decrease in diameter toward the opposite end so that the completed form is of substantially barrel shape before application to the ears 8 and 9.

In applying the mixing elements, the ends of the convolutions are engaged in apertures 11 and 12 of the ears whereby the lower convolutions are adapted to extend substantially in contact with the bottom of the mixing receptacle and the other convolutions extend upwardly and outwardly at varying angles as shown in Fig. 2 to provide extended contact with the material to be mixed. When the mixing elements are thus attached to the shaft, the convolutions are free to flex independently of each other and the endmost convolutions hinge within the apertures of the ears so that the mixing elements automatically adjust themselves to the bottom of the mixing receptacle with which the device is to be used. Attention is also called to the fact that the centers of gravity or greater masses of weight are above the pivotal connection and, therefore, centrifugal action causes the bottom convolutions to scrape on the bottom of the mixing vessel.

In order to obtain the full effect of the mixing device, it is desirable that the mixing device be used in a vessel having a rounded concave bottom as distinguished from the flat or pyramid bottoms of ordinary mixing vessels, however, when the operating pressure is applied with the point 7 bearing on the bottom of the vessel, the bearing point constantly rotates on the same spot, that is, the lowermost point of the rounded bottom, with the result that when the mixing receptacle is formed of the best materials such as plastic, porcelain, glass and similar materials to permit use of the receptacle for measuring ingredients, the bearing point and agitating elements scratch and chip such materials.

In accordance with the present invention, I have provided a mixing receptacle adapted to be formed of such materials and particularly those of transparent character to permit use thereof as a measuring cup and which is constructed to prevent chipping and scratching of the bottom thereof. The receptacle illustrated is preferably of somewhat pitcher-like shape and has an annular wall 13 preferably curving upwardly and outwardly from a base 14 to permit stable support of the receptacle under operation of the mixing device. The upper edge 15 of the wall 13 terminates at one side in a pouring spout 16 having a sharply defined lip 17 which is moulded of definite shape in a properly designed mold to form a sharp cut-off and prevent dribble when the mixed material is poured slowly from the spout. The base 14 is preferably formed by providing the receptacle with an outwardly and downwardly flaring flange 18 having a flattened annular bearing face 19 of ample diameter to prevent tipping over of the receptacle. The inner surface 20 of the wall 13 rounds inwardly as indicated at 21 to form a rounding concave surface 22. Inset in the surface 22 is a disk-shaped plate 23 that is formed of substantially hard material, for example, stainless steel. The plate 23 is of concavo-convex form to correspond with the desired curvature of the bottom of the receptacle and has an outwardly and downwardly flaring rim 24 that is embedded into the material at the time the receptacle is formed. A sufficient amount of the material extends over the upper face 25 of the rim to retain the disk or plate in position and prevent seepage of liquids under the insert. The inner concave face of the insert curves upwardly in a continuous curve and merges with the inner surface of the wall 13 in an unbroken and continuous curve so as to provide a smooth and rounded surface for facilitating cleaning of the receptacle. The receptacle is also preferably provided with scale graduations as indicated at 26 to facilitate measuring of the materials to be mixed therein. The receptacle is further provided with a handle 27 to facilitate handling thereof when emptying the contents.

In using the mixing device in connection with the receptacle, the mixing device is inserted through the open upper end so that the cone bearing end 7 engages the insert as shown in Fig. 1 to move laterally over the insert as the beater is operated. The device is actuated by applying alternate pressure in a downward direction on the handle 5 to cause the mixing elements to gyrate in one direction while the handle is moved downwardly on the spirals 4 and in reverse direction the pressure is released. During these operations the bearing end of the shaft moves laterally over the insert in all directions and does not at all times remain at the center of the insert.

It is thus obvious that the mixing elements oscillate in opposite directions in scraping contact with the inserted plate to effect mixture of the materials.

The relatively hard insert provides a firm bearing for the mixing device and avoids any chipping and scratching of the mixing receptacle. After the material has been mixed it is readily poured from the spout of the receptacle and due to the relatively sharp edge of the pouring spout the material does not dribble down the side of the receptacle when the material is being poured slowly therefrom.

What I claim and desire to secure by Letters Patent is:

1. A mixing vessel of plastic material having an integral bottom and side wall with inwardly curving inner surfaces, a wear resistant plate in contact with said bottom and having a marginal surface joining with the inwardly curving surface of the side wall and having a rim portion embedded into the material of said vessel to maintain said surface in registry with the surface of said plate for forming a smooth continuation of the inner surfaces of said side wall.

2. A mixing vessel of plastic transparent material having integral concave bottom and side wall with inwardly curving inner surfaces substantially joining with the surface of said bottom, a concavo-convex wear resistant plate in contact with said concave bottom and having a marginal surface joining with the inwardly curving surfaces of the side wall and having flaring portion embedded in the material of said vessel to maintain said surfaces in registry with the inner concave surface of said plate for forming a smooth continuation of the inner surfaces of said side wall.

3. In a mixing apparatus, a plastic receptacle for containing materials to be mixed and having a wall and a concave bottom with the inner surfaces of said wall substantially curving into said bottom, a concavo-convex wear resistant disk conforming with and in contact with the surface of said bottom of the receptacle and having anchoring means embedded in the plastic material composing the receptacle, and a rotatable shaft having a bearing end adapted to engage and laterally move over said disk and having resilient coils loosely secured to the lower end of said shaft and extending laterally therefrom, said coils being in circumferential scraping contact with said disk for whipping up materials tending to settle on said disk.

4. In a mixing apparatus, a plastic receptacle for containing materials to be mixed and having a bottom, a wear resistant disk in said receptacle and in contact with and substantially covering said bottom and having anchoring means embedded in the plastic material composing the receptacle, and a rotatable shaft having a bearing end adapted to engage and laterally movable over said disk and having resilient coils loosely secured to the lower end of said shaft and extending laterally therefrom, said coils being in circumferential scraping contact with said disk for whipping up materials tending to settle on said disk.

5. In a mixing apparatus, a receptacle for containing materials to be mixed and having a bottom, a wear resistant disk in contact with and substantially covering the surface of said bottom of the receptacle, and a rotatable shaft having a bearing end adapted to engage and laterally movable over said disk and having resilient coils loosely secured to the lower end of said shaft and extending laterally therefrom, said coils being in circumferential scraping contact with said disk for whipping up materials tending to settle on said disk.

JOSEPH H. WITTMANN.

REFERENCES CITED

The following references are of record in the file of this patent:

UNITED STATES PATENTS

| Number | Name | Date |
|---|---|---|
| 534,889 | Kelly et al. | Feb. 26, 1895 |
| 1,390,251 | Shoppner | Sept. 6, 1921 |
| 1,399,513 | Nyberg | Dec. 6, 1921 |
| 1,882,198 | Slick | Oct. 11, 1932 |
| 1,893,628 | Marsden | Jan. 10, 1933 |
| 1,935,857 | Nachumsohn | Nov. 21, 1933 |
| 2,027,185 | Loomis | Jan. 7, 1936 |
| 2,189,146 | Little | Feb. 6, 1940 |